United States Patent
Diebold et al.

(10) Patent No.: US 7,418,345 B2
(45) Date of Patent: Aug. 26, 2008

(54) METHOD AND DEVICE FOR REDUCING DAMAGE CAUSED BY AN ACCIDENT

(75) Inventors: Jürgen Diebold, Eschborn (DE); Michael Klug, Langen (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 294 days.

(21) Appl. No.: 10/579,103

(22) PCT Filed: Nov. 12, 2004

(86) PCT No.: PCT/EP2004/052946

§ 371 (c)(1),
(2), (4) Date: May 12, 2006

(87) PCT Pub. No.: WO2005/047066

PCT Pub. Date: May 26, 2005

(65) Prior Publication Data

US 2007/0052530 A1     Mar. 8, 2007

(30) Foreign Application Priority Data

Nov. 14, 2003 (DE) .................... 103 53 549

(51) Int. Cl.
*G08G 1/16* (2006.01)
*B62D 6/00* (2006.01)
*G01S 13/93* (2006.01)

(52) U.S. Cl. ............... 701/301; 701/41; 701/70; 342/71

(58) Field of Classification Search .......... 701/41, 701/301
See application file for complete search history.

(56) References Cited

U.S. PATENT DOCUMENTS

| | | | | |
|---|---|---|---|---|
| 3,860,923 A | * | 1/1975 | Yamanaka et al. | 342/72 |
| 3,864,678 A | * | 2/1975 | Yamanaka et al. | 342/59 |
| 5,969,598 A | * | 10/1999 | Kimura | 340/436 |
| 6,086,168 A | * | 7/2000 | Rump | 303/191 |
| 6,359,553 B1 | * | 3/2002 | Kopischke | 340/436 |
| 6,463,372 B1 | * | 10/2002 | Yokota et al. | 701/45 |
| 6,560,520 B2 | * | 5/2003 | Yokota et al. | 701/45 |
| 6,574,540 B2 | * | 6/2003 | Yokota et al. | 701/45 |

(Continued)

FOREIGN PATENT DOCUMENTS

DE     10108879     9/2000

(Continued)

OTHER PUBLICATIONS

Patent Abstracts of Japan, vol. 2000, No. 13, Feb. 5, 2001 & JP 2000 289634 A (Koyo Seiko Co Ltd), Oct. 17, 2000, abstract.

(Continued)

*Primary Examiner*—Thomas G. Black
*Assistant Examiner*—Shelley Chen

(57) ABSTRACT

A method and device serves to reduce damage caused by an accident, in which a vehicle driver is unable to bring the vehicle that has had an accident into a safe position. A system intervenes in an appropriate manner into the motional behavior of the vehicle, influencing the latter in such a way that the vehicle can be brought into a safe position without the cooperation of the driver (autonomously).

9 Claims, 3 Drawing Sheets

U.S. PATENT DOCUMENTS

| | | | |
|---|---|---|---|
| 7,197,396 B2* | 3/2007 | Stopczynski | 701/301 |
| 2002/0177934 A1* | 11/2002 | Yokota et al. | 701/45 |
| 2002/0188393 A1* | 12/2002 | Yokota et al. | 701/45 |
| 2004/0030498 A1* | 2/2004 | Knoop et al. | 701/301 |
| 2004/0254729 A1* | 12/2004 | Browne et al. | 701/301 |
| 2006/0106538 A1* | 5/2006 | Browne et al. | 701/301 |

FOREIGN PATENT DOCUMENTS

DE    10102772    7/2002

OTHER PUBLICATIONS

Patent Abstracts of Japan, vol. 2000, No. 08, Oct. 6, 2000 & JP 2000 142321 A (Fujitsu Ten Ltd), May 23, 2000, abstract; illustrations.

* cited by examiner

METHOD AND DEVICE FOR REDUCING DAMAGE CAUSED BY AN ACCIDENT

BACKGROUND OF THE INVENTION

The present invention relates to a method and a device for reducing damage caused by an accident after a primary accident, in which in particular a vehicle driver is unable to bring the vehicle that has had an accident into a safe position.

Previous systems of active and passive safety aim at a primary accident. As the primary accident is taking place, the driver is usually in full control of the vehicle. Thus, he is in a position to actively influence the behavior of the vehicle.

In order to avoid primary accidents, devices which automatically counteract instabilities of the vehicle have been integrated into the vehicles. These devices comprise a large number of driving stability control systems. The term 'driving stability control' combines five principles of influencing the driving behavior of a vehicle by means of predeterminable pressures or brake forces in or at individual wheel brakes and by means of intervention into the engine management of the driving engine. These systems refer to brake slip control (ABS) which is meant to prevent individual wheels from locking during a braking operation, traction control (TCS) preventing the spinning of the driven wheels, electronic brake force distribution (EBD) for controlling the relationship between the brake force on the front and rear axles of the vehicle, roll-over prevention (ARP) to prevent roll-over of a vehicle about its longitudinal axis, and yaw torque control (ESP) which safeguards stable driving conditions when the vehicle yaws about its vertical axis.

A vehicle is defined in this connection as a motor vehicle with four wheels, which is equipped with a hydraulic, an elector-hydraulic or electro-mechanical brake system. In the hydraulic brake system, brake pressure can be built up by the driver by means of a pedal-actuated master cylinder, while the electro-hydraulic and electromechanical brake systems build up a brake force in response to the sensed braking request of the driver. Hereinbelow, reference is made to a hydraulic brake system. Each wheel has a brake, with which one inlet valve and one outlet valve each is associated. The wheel brakes communicate with the master cylinder by way of the inlet valves, while the outlet valves lead to a pressureless tank or to a low-pressure accumulator. Finally, there also is an auxiliary pressure source, which is able to build up a pressure in the wheel brakes regardless of the position of the brake pedal. The inlet and outlet valves can be electromagnetically actuated for pressure control in the wheel brakes.

To detect states in the dynamics of the vehicle movement, there are four speed sensors, one per wheel, at least one yaw rate meter, one lateral acceleration meter, optionally one longitudinal acceleration sensor, and at least one pressure sensor for the brake pressure generated by the brake pedal. The pressure sensor may be replaced with a pedal travel or pedal force meter if the auxiliary pressure source is arranged such that a brake pressure built up by the driver is not distinguishable from that of the auxiliary pressure source.

In driving stability control, the driving behavior of a vehicle is influenced such that the driver will be better able to master the vehicle in critical situations. A critical situation is defined herein as an unstable driving condition in which, in the extreme case, the vehicle does not follow the driver's instructions. The function of driving stability control is consequently to impart to the vehicle the behavior desired by the driver in such situations within the physical limits.

While the longitudinal slip of the tires on the road surface is mainly of significance for the brake slip control system, the traction slip control system and the electronic brake force distribution system, the yaw torque control system (YTC) also involves additional variables, e.g., the yaw rate and the tire slip angle velocity. Anti-rollover control systems generally evaluate variables relating to lateral acceleration or roll variables (DE 196 32 943 A1).

In addition to driving stability control systems, assist and safety systems are provided in vehicles at an increasing rate, analyzing traffic situations based on an ambience sensor system and automatically adapting the vehicle speed to the detected driving situation depending on the detected ambience, or initiating the active safety systems because an accident is forecast due to a detected risk potential.

However, consequential accidents may happen subsequent to a primary accident in a number of scenarios. Hence, the vehicle which has had an accident presents a high risk to both its occupants as well as to other traffic participants, what is due to its further uncontrolled movement pattern until standstill. This risk is not mastered by the state of the art. Once the driver has lost control of the vehicle after the primary accident, because he lost consciousness or suffered a shock, not even an ESP system will make it possible for him to bring the vehicle safely to standstill or steer it safely around possible obstacles.

In view of the above, an object of the invention is to design the vehicle systems in such a manner that an appropriate control intervention is carried out before the vehicle which has had the accident causes consequential accidents.

SUMMARY OF THE INVENTION

The method for reducing damage caused by an accident after a primary accident is favorably characterized by the steps of detecting the primary accident, sensing and analyzing the ambience of the vehicle, detecting the motional behavior of the vehicle, comparing the analyzed vehicle ambience with the motional behavior of the vehicle, and determining the intervention into the brakes and/or into the steering system of the vehicle depending on the comparison result.

It is advantageous that the primary accident is detected by means of the acceleration sensors of a driving dynamics control system, the airbag-acceleration sensors, the airbag activating system, or a seatbelt constraint activating system of the vehicle.

The vehicle ambience is preferably sensed by means of radar sensors and/or lidar sensors (optoelectronic sensors operating according to the principle of optometry, preferably infrared sensors) and/or image-recording sensors such as a camera, and the position and dimensions of objects in the vehicle ambience are determined in a unit.

The vehicle sensors provided in or at the vehicle are favorably used to detect the motional behavior of the vehicle.

As this occurs, the trajectory and the speed of the vehicle are compared with the position and the distance of objects in the vehicle trajectory, and intervention into the brakes and/or the steering system is carried out depending on the comparison result.

In addition, there is a display element and actuating element by means of which an imminent intervention into the brakes and/or the steering system can be indicated to the driver, and the intervention is stopped by actuation of the actuating element.

The intervention is carried out automatically if the actuating element is not actuated after a predetermined time interval.

To alert the traffic participants concerned, it is arranged for that the optical signal transmitters of the vehicle are automatically triggered prior to the intervention.

Advantageously, a device is provided for reducing damage caused by an accident after a primary accident, which includes detection units for detecting the primary accident, sensing units for sensing and analyzing the ambience of the vehicle, for detecting the motional behavior of the vehicle, a unit for comparing the analyzed vehicle ambience with the motional behavior of the vehicle and for determining the intervention into the brakes and/or into the steering system.

In addition, the device favorably includes an actuating element enabling the driver to stop the intervention into the brakes and/or into the steering system.

Consequently, the method for reducing damage caused by an accident after a primary accident, when it is impossible for the driver to bring the vehicle that has had an accident into a safe position, advantageously provides that a device or a system intervenes in an appropriate manner into the motional behavior of the vehicle, influencing the latter in such a way that the vehicle is brought into a safe position without the cooperation of the driver (autonomously).

This provision allows protecting the driver and other occupants in a favorable manner from additional injuries that result from consequential accidents when the driver loses control of the vehicle after the primary accident.

The method founds on an appropriate selection of the object avoidance trajectory until safe standstill by means of the ambience sensor system. Simply braking the vehicle without regard to the current traffic situation, however, would even increase the risk of further collisions and jeopardize the traffic that is following.

An embodiment of the invention is illustrated in the accompanying drawings and will be referred to in detail hereinbelow.

DETAILED DESCRIPTION OF THE DRAWINGS

Figure 1:
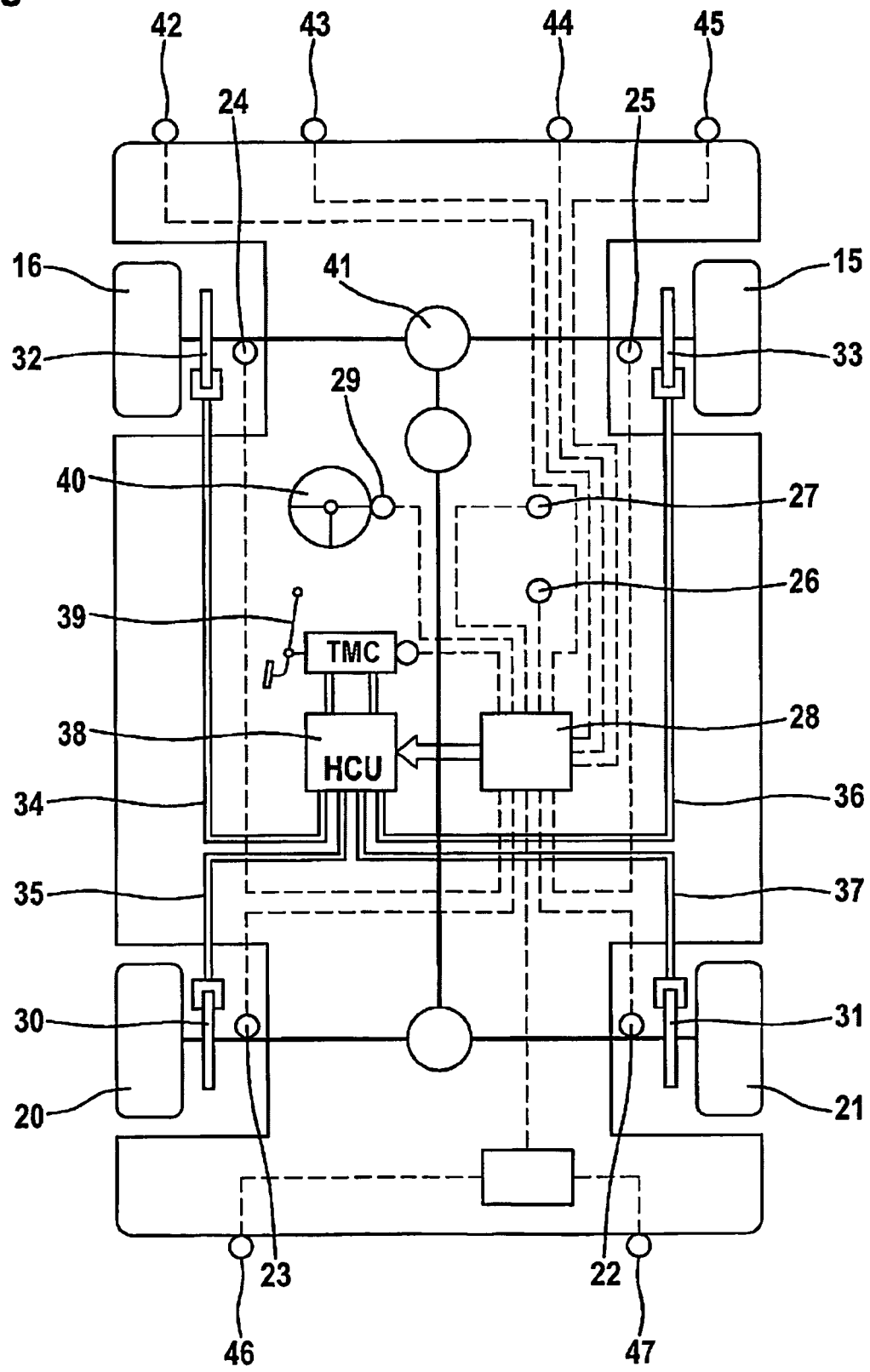
FIG. 1 shows a vehicle comprising the components of a driving dynamics control system and an ambience sensor system.

FIG. 1 schematically shows a vehicle equipped with a brake control system. Four wheels 15, 16, 20, 21 are illustrated in FIG. 1. Each one wheel sensor 22 to 25 is provided on each of the wheels 15, 16, 20, 21. The signals are sent to an electronic control unit 28 which determines the vehicle speed $v_{Ref}$ from the wheel rotational speeds based on predefined criteria. Further, a yaw rate sensor 26, a lateral acceleration sensor 27, optionally a longitudinal acceleration sensor, and a steering angle sensor 29 are connected to the control unit 28. The yaw rate sensor senses the actual yaw velocity of the vehicle. This actual yaw velocity is compared to the nominal yaw velocity determined in a vehicle model. When the actual and the nominal yaw velocities differ from each other, the control unit 28 superimposes a torque on the vehicle which leads the actual yaw velocity to the nominal yaw velocity. To this end, the control unit 28 adjusts the brake pressure individually in the wheel brakes. The quantity of the steering wheel or of the steering angles of the wheels sensed by the steering angle sensor 29 is mainly taken into consideration in the vehicle model. By way of electronically or mechanically actuatable elements 41 in the steering track, it is also possible to control the steerable wheels 15, 16 (e.g. in a front-wheel steering system) in response to yaw angle signals or signals from ambience sensors 42 to 47. Ambience sensors sense the ambience of the vehicle in the short range and/or distant range by means of radar and/or infrared radiation and/or by means of optical elements. Each wheel further includes a wheel brake 30 to 33. These brakes are hydraulically operated and receive pressurized hydraulic fluid by way of hydraulic conduits 34 to 37. The brake pressure is regulated by way of a valve block 38, and the latter valve block is driven, independently of the driver, by electric signals which are produced in the electronic control unit 28. Brake pressure can be introduced into the hydraulic conduits using a master cylinder actuated by a brake pedal. Pressure sensors which allow sensing the driver's request for braking are arranged in the master cylinder or in the hydraulic conduits.

When assuming that an accident has taken place and the vehicle has not yet come to standstill in a safe position, this vehicle represents a potential hazard for the occupants and the ambience.

Under certain circumstances, the driver is unable to preset an obstacle-free driving course as a nominal course at the steering wheel and/or slow down the vehicle until standstill.

Figure 2:
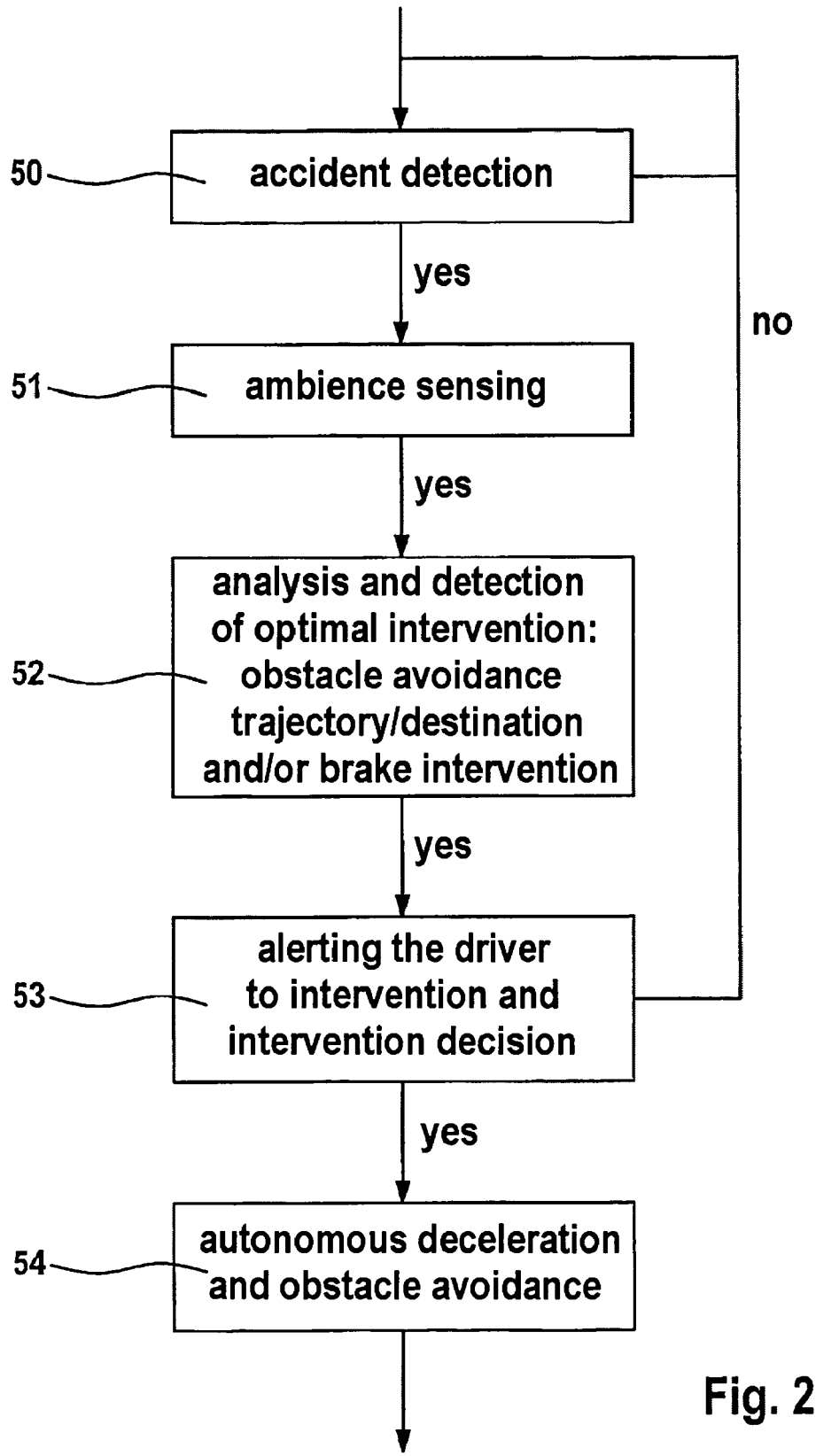
FIG. 2 is a flow chart showing the method of the invention.
Figure 3:
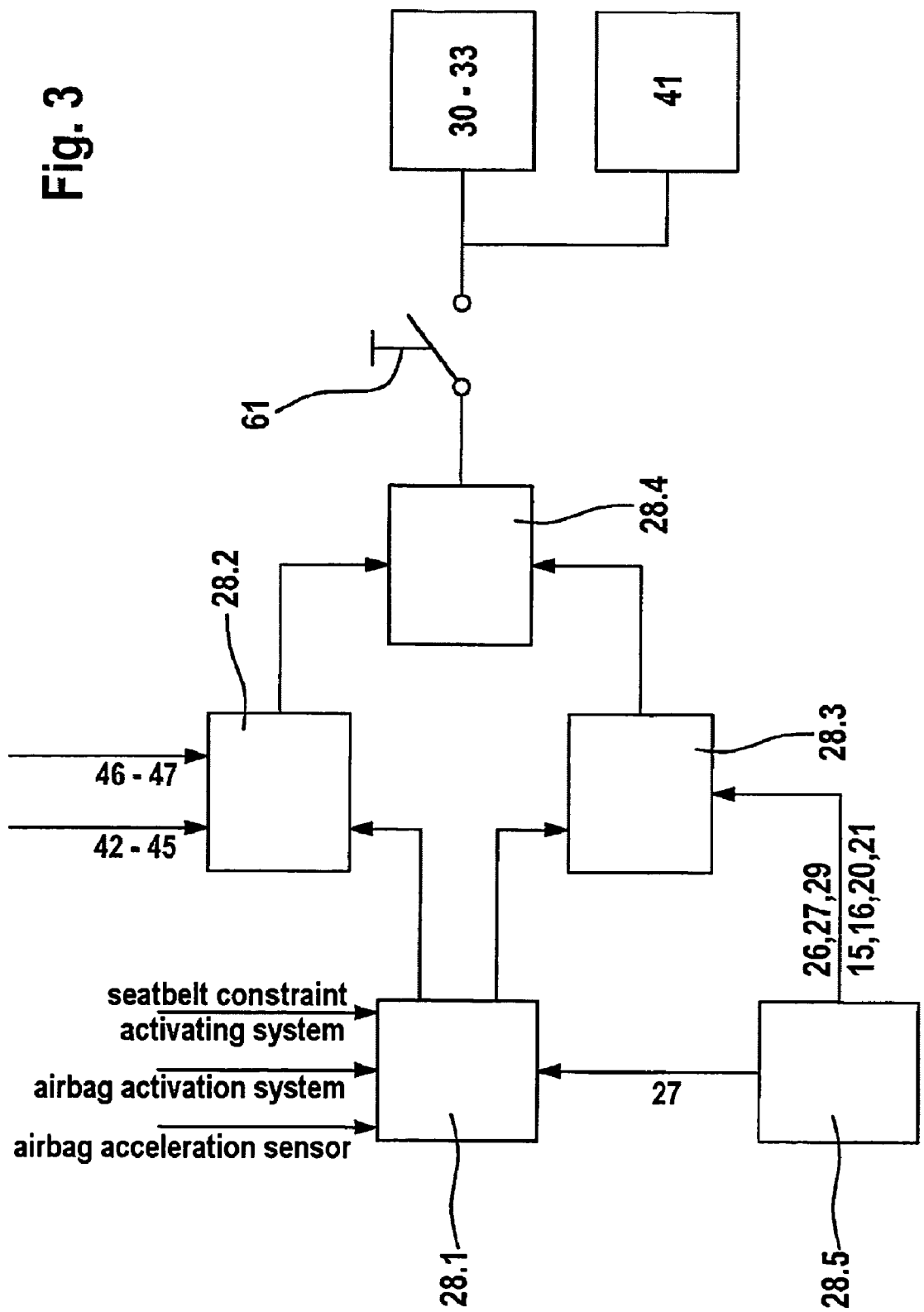
FIG. 3 is a schematic block diagram of the controller unit of FIG. 1.

FIGS. 2 and 3 show a flow chart, which relates to the method of preventing consequential accidents subsequent to a primary accident. With the program run illustrated, first of all a primary accident is identified in step 50 in the detection unit 28.1. This can be derived e.g. from the acceleration sensors 27 (lateral and/or longitudinal acceleration sensors) of the driving dynamics control 28.5 (ESP), the airbag acceleration sensors, the airbag activating system itself, or a seatbelt constraint activating system.

Subsequently, the traffic situation is analyzed in step 51 by way of the ambience sensor system (e.g. LIDAR, RADAR, camera, or advantageously a combination of these methods) in a logic unit 28.2 (step 52). As this occurs, obstacles or objects are detected with respect to their position relative to the vehicle and their dimensions, and favorably they are also classified. Based on the ambience detected, it is possible to determine in the logic unit 28.4 the intervention into the vehicle to be performed, depending on the motional behavior of the vehicle that has had an accident which is detected in the detection unit 28.3, such as speed, vehicle trajectory, yaw performance, and the like. In this arrangement, a distinction can be made between at least three principal intervention situations which may also be performed in a combination:

autonomous braking for achieving vehicle deceleration
autonomous braking for superimposing a torque
autonomous steering intervention.

Autonomous braking can be performed exclusively when no objects in the range of the vehicle are found in the analysis of the traffic situation. The vehicle can then be decelerated with adjusted energy until standstill.

When there are objects in the vehicle trajectory, a trajectory for avoiding these objects can be found, allowing decelerating the vehicle autonomously and safely until standstill. Accordingly, continued jeopardy of the occupants and other traffic participants can be reduced. The objective is to decelerate the uncontrolled vehicle as quickly as possible until standstill, without causing any further collisions.

A combined intervention of braking and steering is advantageously performed. In this respect, braking implies an intervention into all wheels 15, 16, 20, 21 (decelerating) or into at least one wheel (superimposing a torque) with the same or a differing amount of brake pressure. It must be taken into consideration that initially the speed is reduced, i.e. kinetic energy is removed from the vehicle. Only if the speed is lower than a defined threshold will an additional steering intervention be performed. A condition is that the ambience sensor system 42 to 45 has identified an appropriate safe place where the vehicle can be brought to standstill in a safe way. The steering intervention is only allowed to maximally adopt such a rate as to prevent conditions which are critically in terms of driving dynamics, i.e. lateral acceleration of roughly 0.4 g must not be exceeded. Of course, these interventions are possible only while constantly monitoring the ambience. Thus, it is e.g. necessary to also monitor the traffic in the rear when an autonomous emergency brake intervention takes place.

A method which can make use of a rear-view ambience sensor system 46, 47 is especially favorable. It is thereby possible to include the traffic in the rear and/or the ambience in the rear into the autonomous obstacle avoidance and/or deceleration process.

In this arrangement, the deceleration of the own vehicle must not exceed (1).

$$a_E \leq a_{\mu max} + a_{rel0} - \frac{2s_{rel0}a_{rel0} - v_{rel0}^2}{2(s_{rel0} + v_{rel0}t_{reak}) + a_{rel0}t_{reak}^2} \quad (1)$$

with: $a_{\mu max}$: maximum physically possible deceleration
$S_{rel0}$: distance at the time monitored
$V_{rel0}$: relative speed at the time monitored
$a_{rel0}$: relative acceleration at the time monitored
$t_{reak}$: reaction time of the driver Prior to the autonomous intervention, the driver is informed or alerted in step 53 so that he is able to prevent the automatic obstacle avoidance and/or deceleration by way of an operating device 61 and can further exercise control. When the operating device is activated by the driver, the program run is carried out again starting step 50.

When a time limit is exceeded, it will be indicated to the driver and the subsequent traffic, e.g. by activating the warning lights and/or stop lights, that the emergency maneuver has been initiated, and the emergency intervention (autonomous deceleration and/or obstacle avoidance) is carried out in step 54.

It is particularly favorable that the system can also be activated in vehicles equipped with a hands-off detection and detection of an unstable driving condition (e.g. because the driver has lost consciousness), and autonomous deceleration and/or avoidance is initiated until safe standstill.

The invention claimed is:

1. A method for reducing damage caused by an accident after a primary accident of a vehicle,
comprising the steps of
detecting the primary accident,
sensing and analyzing the ambience field of the vehicle,
detecting the motional behavior of the vehicle,
comparing the analyzed vehicle ambience with the motional behavior of the vehicle, wherein the trajectory and the speed of the vehicle representing the motional behavior are compared with the position and the distance of objects in the vehicle trajectory representing the vehicle ambience and
determining an intervention into at least one member of the group consisting of brakes and steering system of the vehicle, depending on the result of the comparison.

2. The method as claimed in claim 1,
wherein the primary accident is detected by means of at least one member of the group consisting of acceleration sensors (27) of a driving dynamics control system, airbag-acceleration sensors, an airbag activating system, and a seatbelt constraint activating system.

3. The method as claimed in claim 1,
wherein the vehicle ambience is sensed by means of at least one sensing device out of the group consisting of radar sensors, infrared sensors, and a camera (42 to 47), and the position and dimensions of objects in the vehicle ambience are determined in a unit (28).

4. The method as claimed in claim 1,
wherein the motional behavior of the vehicle is determined by vehicle sensors (22 to 25, 26, 27, 29).

5. The method as claimed in claim 1,
further comprising the step of indicating an imminent intervention on a display element and canceling the intervention if the driver actuates and an actuating element.

6. The method as claimed in claim 5,
wherein the intervention is carried out automatically after a predetermined time interval.

7. The method as claimed in any one of claim 1,
comprising the step of automatically triggering optical signal transmitters of the vehicle.

8. A device for reducing damage caused by an accident after a primary accident,
the device comprising detection units (28.1) for detecting the primary accident,
sensing units (42 to 47, 28.3) for sensing and analyzing the ambience of the vehicle,
detection units (15, 16, 20, 21, 26, 29, 28.3) for detecting the motional behavior of the vehicle,
a unit (28.4) for comparing the analyzed vehicle ambience with the motional behavior of the vehicle and for determining an intervention into at least one member of the group consisting of brakes (30 to 33) and a steering system (41), wherein the trajectory and the speed of the vehicle representing the motional behavior are compared with the position and the distance of objects in the vehicle trajectory representing the vehicle ambience.

9. The device as claimed in claim 8,
further comprising an actuating element (61) enabling the driver to stop the intervention into the brakes (30 to 33) and/or into the steering system (41).

* * * * *